US006680776B2

(12) United States Patent
Barrett

(10) Patent No.: US 6,680,776 B2
(45) Date of Patent: Jan. 20, 2004

(54) METHOD AND APPARATUS FOR SENSING A POWER LEVEL OF A COMMUNICATIONS BEAM IN A FIBER OPTIC SWITCH

(75) Inventor: Todd K. Barrett, San Diego, CA (US)

(73) Assignee: Trex Enterprises Corp., San Diego, CA (US)

( * ) Notice: Subject to any disclaimer, the term of this patent is extended or adjusted under 35 U.S.C. 154(b) by 0 days.

(21) Appl. No.: 09/960,274

(22) Filed: Sep. 20, 2001

(65) Prior Publication Data
US 2003/0231295 A1 Dec. 18, 2003

(51) Int. Cl.$^7$ ............................................... G01N 21/00
(52) U.S. Cl. ..................................................... 356/73.1
(58) Field of Search ........................ 356/73.1; 385/140, 385/18, 15, 24, 39; 359/166, 150, 109–127, 168

(56) References Cited

U.S. PATENT DOCUMENTS

| 5,048,969 A | * | 9/1991 | Deason et al. ............... 356/432 |
| 2002/0071627 A1 | * | 6/2002 | Smith et al. .................. 385/15 |
| 2002/0094187 A1 | * | 7/2002 | Barrett ......................... 385/140 |

* cited by examiner

Primary Examiner—Tu T. Nguyen
(74) Attorney, Agent, or Firm—Gary Eastman

(57) ABSTRACT

A method and system for detecting a power level of a communication light beam is disclosed. In one embodiment, a fiber optic switch beam generation element generates a communication light beam that may be received at a beam splitter. The beam splitter may be configured to produce a reflected light beam that reflects a portion of the communication light beam, while permitting at least a portion of the communication light beam to propagate through the beam splitter. A reflected light beam detector may be used to detect the reflected light beam. The power level (e.g., light energy) of the communication light beam may then be calculated based on the light energy of the reflected light beam.

6 Claims, 9 Drawing Sheets

Communication Beam Power Level Sensor

Communication Beam Generation and Receiving Portions
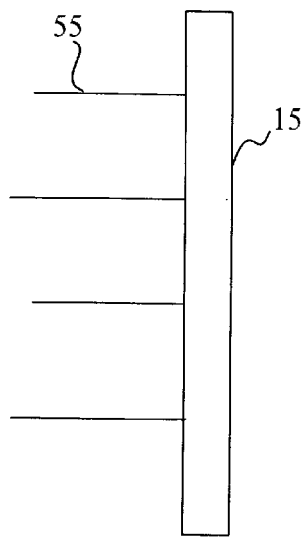
FIG. 2A
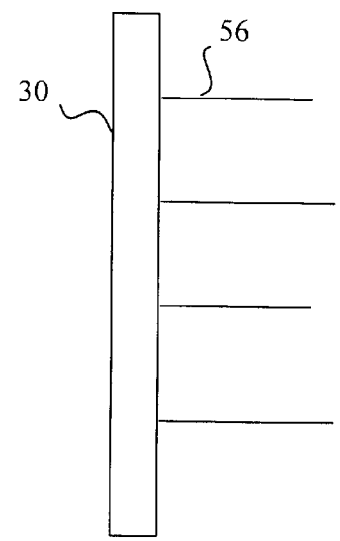
FIG. 2C
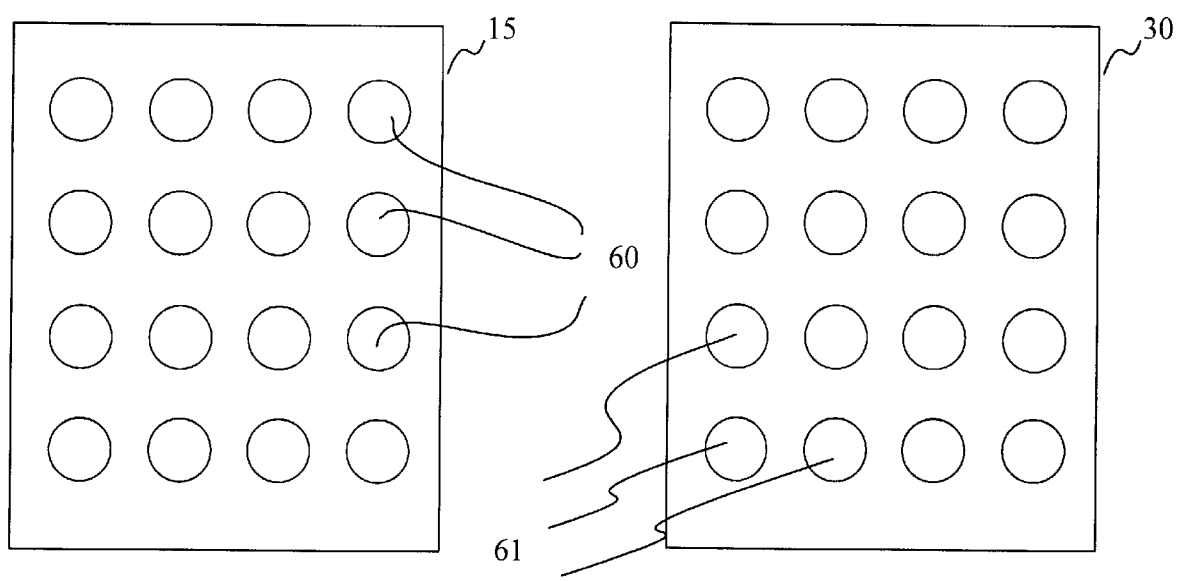
FIG. 2B          FIG. 2D

Reflected Beam Detector

Alternative Sensor Configuration

METHOD AND APPARATUS FOR SENSING A POWER LEVEL OF A COMMUNICATIONS BEAM IN A FIBER OPTIC SWITCH

FIELD OF THE INVENTION

The present invention relates to fiber optic communication systems, and in particular, to a power sensor that may be used to determine energy levels of light beams propagating through a fiber optic switch.

BACKGROUND OF THE INVENTION

Over the past several decades, the telecommunications industry has exploded, and the incorporation of optical fiber into this industry is revolutionizing the way information is transmitted. Communication systems which use optical fiber as the transmission media offer some significant advantages over past wire-based systems, such as higher bandwidths and transmission rates, lower transmission losses, lower implementation costs, and greater electrical isolation.

Despite the benefits which exist in the optical transmission of information, one of the most difficult challenges in the widespread adoption of optical fiber in the telecommunications industry is the inability to route these optical signals effectively between optical fibers. The routing of these optical signals is typically accomplished using a cross-connect switch.

Historically, the switching of optical signals between optical fibers has included the detection and conversion of the optical signal to an electrical signal, and then switching and re-modulating the electrical signal to a new optical signal for transmission over a different optical fiber. Unfortunately, due to the power consumption and bandwidth limitations within the electronic switch circuitry and the expense of such a switching system, the optical-electrical-optical switch topology has not been widely adopted in the telecommunications industry.

Recently, a number of optical cross connect switches have been developed in order to switch optical signals directly from one fiber to another, thereby eliminating the need to convert the optical signal to an interim electrical signal. These optical switches incorporate various optical switch elements, such as mirrors, prisms, fiber collimators, and complicated drive mechanisms, to route optical signals through the switch. Because of the extremely tight tolerances necessary for proper angular alignment of the various reflective elements, as well as the open-loop responses of these reflective elements is insufficient to step perfectly into position, a very sophisticated feedback control system is required, often resulting in these switches being prone to failure and requiring significant maintenance.

As the telecommunications industry continues to develop and grow to service more and more customers, the need for large scale, reliable optical switches will also increase. Consequently, there is a need for a device that may be used in a fiber optic switch, for example, which can calculate the power level of a light beam propagating through the switch. There is also a need for a device that can calculate the power of a light beam comprising data, for example, without actually measuring the light beam itself.

SUMMARY OF THE INVENTION

The Optical Cross Connect Switch of the present invention includes a method and system for detecting a power level of a communication light beam. The method and system may include receiving the communication light beam at a beam splitter after the communication light beam has been generated at a fiber optic switch beam generation element. A beam splitter may be used to reflect a portion of the communication light beam to produce a reflected light beam, while permitting at least a portion of the communication light beam to propagate through the beam splitter, to produce a transmitted light beam. A reflected light beam detector, for example, may be used to detect the reflected light beam. Lastly, in one embodiment, the power level (e.g., light energy) of the communication light beam may be calculated based on the light energy of the reflected light beam.

In accordance with one aspect of the present invention, the power level may include an incident light energy of the communication light beam.

In accordance with another aspect of the present invention, the power level may include a transmitted light energy of the transmitted light beam.

In another aspect of the present invention, the beam splitter is disposed between a fiber optic switch beam generation element and a fiber optic switch beam receiving element.

In still yet another aspect of the present invention, the fiber optic switch beam generation element includes at least one fiber optic input fiber, while the fiber optic switch beam receiving element includes at least one fiber optic output fiber that may receive the transmitted light beam. In this aspect, the at least one output fibers also may be configured to communicate data.

In another aspect of the present invention, the fiber optic switch beam generation element includes a plurality of fiber optic input fibers, while the fiber optic switch beam receiving element includes a plurality of fiber optic output fibers.

In yet another aspect of the present invention, a plurality of fiber optic input fibers and a plurality of fiber optic output fibers may be configured in a two-dimensional array.

In still yet another aspect of the present invention, the reflected light beam detector may be configured with an optical sensor that is in communication with a analyzer. The analyzer may be configured calculate which one of the plurality of fiber optic fibers generated and/or received the communication light beam.

In yet another aspect of the present invention, the power level of the communication beam may be calculated by determining the light energy of the reflected light beam by using an optical sensor that is in communication with said reflected light beam detector. In this aspect, the levels of the reflected light energy and transmitted light energy produced by said beam splitter also may be used to process the power level calculation.

In accordance with another aspect of the present invention, a reflected light beam detector may be configured with an optical sensor that is in communication with a analyzer. The analyzer may use the detection of the reflected light beam to indicate an existence of a communication light beam in the optical switch.

BRIEF DESCRIPTION OF THE DRAWINGS

The nature, objects, and advantages of the present invention will become more apparent to those skilled in the art after considering the following detailed description in connection with the accompanying drawings, in which like reference numerals designate like parts throughout, and wherein:

FIGS. 2A–2D are side and front views of an exemplary configuration of the beam generating and receiving portions of the communication beam power level sensor of the present invention;

DETAILED DESCRIPTION OF A PREFERRED EMBODIMENT

In the following description of a preferred embodiment, reference is made to the accompanying drawings, which form a part hereof, and which show by way of illustration a specific embodiment of the invention. It is to be understood by those of working skill in this technological field that other embodiments may be utilized, and structural as well as procedural changes may be made without departing from the scope of the present invention.

Figure 1:
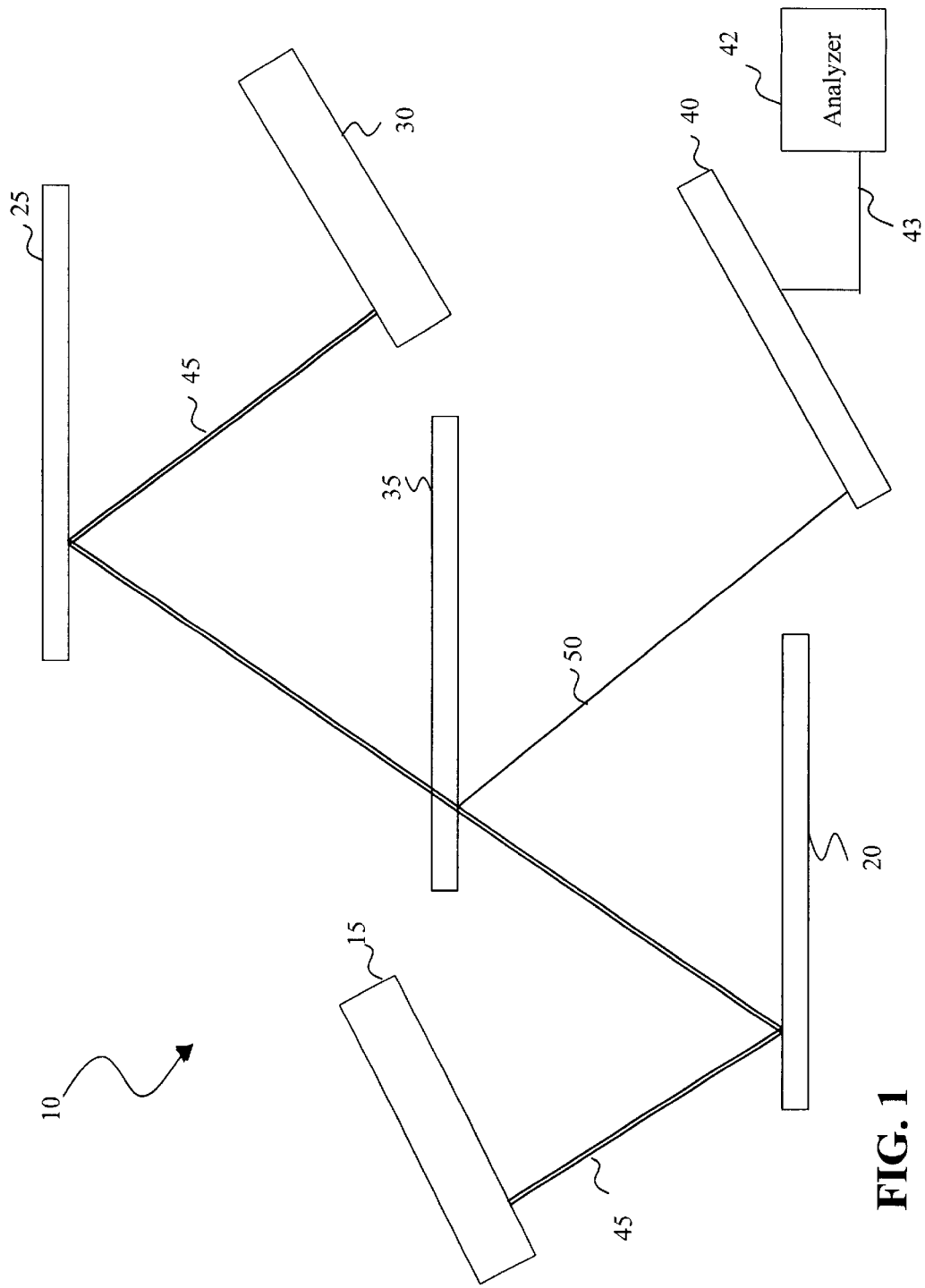
FIG. 1 is a diagram illustrating an exemplary configuration of some of the major components of the communication beam power level sensor of the present invention.

Referring initially to FIG. 1, an exemplary configuration of a communication beam power level sensor is shown and generally designated 10. As shown in this Figure, sensor 10 includes several components, including a beam generation element 15, beam directing elements 20 and 25, and a beam receiving element 30. Sensor 10 is also shown having a beam splitter 35, as well as a reflected beam detector 40 that is in communication with analyzer 42.

Beam generating element 15 may be configured to generate one or more optical beams. In a typical configuration, beam generating element 15 may be configured to receive a number of optical fibers (not shown in this Figure) as well as any necessary structure (e.g., optical lenses, ferrules, etc.) so that an optical beam, such as a fiber optic signal, may be generated.

Similarly, beam receiving element 30 may be configured so that the one or more optical beams, generated by beam generating element 15, can be received. Typically, beam receiving element 30 is configured to receive a number of output fibers (not shown in this Figure) and also may include structural elements such as optical lenses, ferrules, and the like.

Referring still to FIG. 1, a communication beam 45 may be generated at beam generator 15, where it propagates over a distance until it impinges upon a first beam directing element 20. The first beam directing element 20 then directs the communication beam 45 to a second beam directing element 25. The communication beam 45 may then be directed by the second beam directing element 25 to the appropriate portion of the beam receiver 30. It is to be understood that beam directing elements 20 and 25 will typically comprise similar structures for directing light beams. As such, the description relating to the first beam directing element 20 also applies to the second beam directing element 25. In one embodiment, beam splitter 35 may be disposed between the first and second beam directing elements 20. However, the present invention is not so limited and any of a variety of different configurations and positions may be utilized. For example, the beam splitter 35 may be positioned so that it receives communication beam 45 either before the first beam directing element 20, or after the second beam directing element 25.

FIG. 1 further shows that a portion of the communication beam 45 is reflected to beam detector 40. In one embodiment, the beam splitter 35 permits the majority of the light energy of the communication beam 45 to reach the beam receiver 30, while the reflected beam detector 40 receives at least some of the remaining light energy (e.g., reflected light beam 50).

The power level sensor of the present invention may be utilized in any of a number of available communication devices that utilize an optical switching mechanism. Typical optical communication systems selectively switch a communication beam from an input fiber to one or more output fibers using a variety of methods.

One implementation of the present invention may be used in conjunction with the system disclosed in U.S. patent application Ser. No. 09/846,879, entitled "OPTICAL CROSS CONNECT SWITCH", filed Apr. 30, 2001, the entire disclosure of which is incorporated herein by reference for all purposes. However, it is to be understood that the present is not limited to any particular communication system.

Referring now to FIGS. 2A–2D, side and front views of an exemplary configuration of the beam generating element 15 and beam receiving element 30 are shown. Typically, as shown in FIGS. 2A and 2B, the beam generating element 15 will comprise a two-dimensional array of fiber optic input fibers 55 and associated lenses 60. For example, the array shown in these Figures is a 4×4 array corresponding to sixteen communication beams. It is also notable that beam generating element 15 often comprises beam-directing elements that may include some type of electromechanical (MEMS) devices.

FIGS. 2C and 2D show one example of how the beam receiving element 30 may be configured. Similarly to the beam generating element 15, the beam receiving element 30 may comprise a two-dimensional array of fiber optic output fibers 56 and associated lenses 61. In these Figures, the beam receiving element 30 is shown in a 4×4 array configuration, which may receive a corresponding sixteen communication beams (e.g., communication beam 45).

Although the beam generating and receiving elements 15 and 30 are shown in a 4×4 array configuration, the present invention is not so limited. One of ordinary skill in the art will realize that the sensor 10 may be utilized in switches having beam generation and receiving elements that are of varying sizes, such as 2×2, 4×4, 6×6, 16×16, for example.

Figure 3:
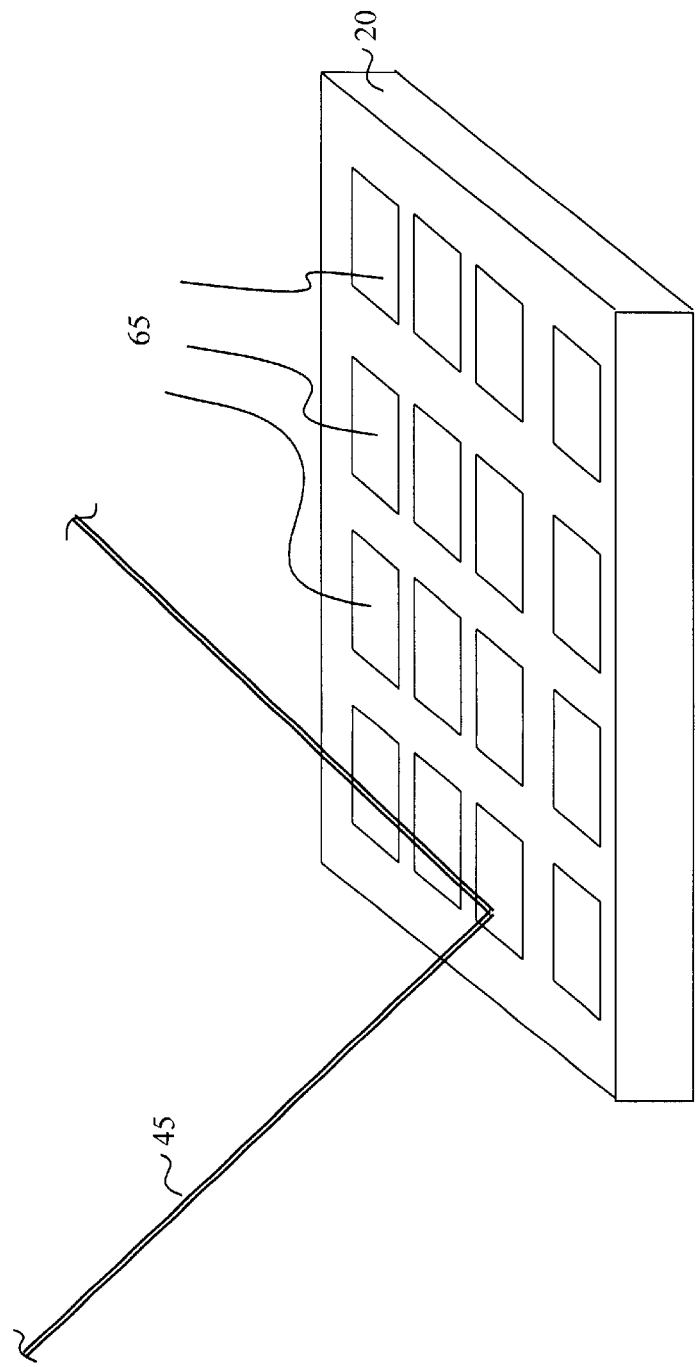
FIG. 3 is a perspective view of an exemplary beam directing element utilized in the communication beam power level sensor of the present invention.

FIG. 3 shows a more detailed view of an exemplary beam directing element 20 having a plurality of beam directing devices 65. Again, beam directing elements 20 and 25 are typically configured with similar light beam directing devices (e.g., beam directing devices 65). Beam directing devices 65 may include a micro electromechanical system, which is commonly referred to as a MEMS device. As is known in the art, MEMS devices are manufactured of silicon using techniques similar to those techniques for manufacturing semiconductor devices. MEMS devices can vary the orientation of its substantially planar reflective surface by varying the voltages applied to the device.

Typically, the reflective surface (e.g., beam directing devices 65) may be rotated about two axes, where the axes are orthogonal. A variety of different types of MEMS devices may be used in the present invention, such as continuous or three-dimensional steering MEMS devices. It is to be understood that the axis of rotation of the MEMS device is typically perpendicular; however, non-perpendicular orientations are also contemplated, and fully within the scope of the present invention. For clarity, further description of MEMS devices is omitted in the present application since these devices are known in the art.

In a typical configuration, beam directing elements 20 contain an identical number of beam directing devices (e.g., 2×2, 4×4, 6×6, 16×16, etc.) However, the present invention may easily be configured to accommodate beam directing elements having different numbers of beam directing devices 65. This may be accomplished by leveraging the ability of the beam directing device 65 to direct a communication beam to precise locations upon other beam directing elements (e.g. beam directing elements 20 and 25).

Looking at FIGS. 1 and 3 together, a communication beam 45 is shown propagating from beam generator 15, and striking beam directing element 20 at one of the beam directing devices 65. Since beam directing device 65 may be rotated about one or more axes, the communication beam 45 may be redirected to any beam directing element on the second beam element 25 simply by rotating the appropriate beam directing device about its axis (or axes). Thus, as discussed above in conjunction with FIG. 1, communication beam 45 may be directed to any beam directing device 65 on the second beam director 25, which in turn directs the communication beam to its associated output fiber (not shown in these Figures) located at beam receiving element 30.

Figure 4:
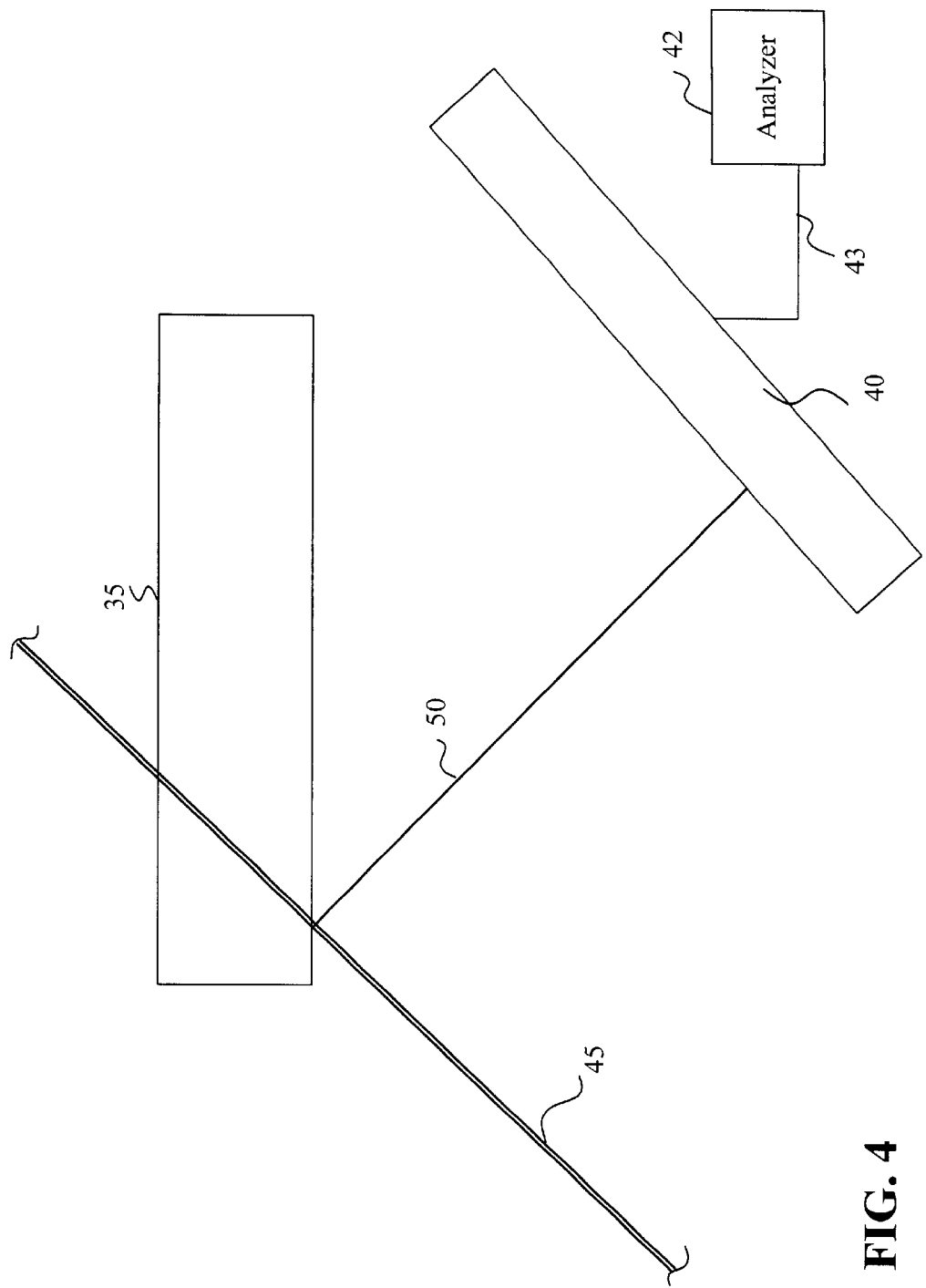
FIG. 4 is a detailed view of an exemplary configuration of the beam splitter and reflected beam detector components of the communication beam power level sensor of the present invention.

Referring now to FIG. 4, a more detailed illustration of the beam splitter 35 and the reflected beam detector 40 is shown. In this Figure, communication beam 45 is shown propagating through beam splitter 35 and continuing along a directed path. Reflected beam 50 originates when a portion of the communication beam 45 is reflected at the beam splitter 35. Once created, the reflected beam 50 continues along a path until it strikes beam detector 40. Upon striking reflected beam detector 40, a signal may be created that can be detected and processed by analyzer 42. It is to be understood that communication beam 45 will have a measurable light energy prior to reaching beam splitter 35. However, as the communication beam 45 propagates through beam splitter 35, the communication beam's energy will typically be reduced because of the creation of reflected beam 50. Additionally, energy absorbed by the beam splitter 35 may contribute to the reduction of the communication beam's energy.

The term incident light energy will be used in the present specification to denote the amount of light energy of communication beam 45 prior to striking beam splitter 35. The term transmitted light energy will be used to denote the amount of light energy of the communication beam 45 after propagating through beam splitter 35. And the term reflected light energy will be used to refer to the amount of light energy of reflected beam 50.

Beam splitter 35 may be constructed with most any of the known beam splitter construction materials (e.g., glass, dielectric film, etc.) Although beam splitter 35 is shown having a rectangular shape, the present invention is not so limited and a beam splitter of most any shape may be used (e.g., cubical, cylindrical, spherical, polygonal, etc.)

Although beam splitter 35 is not limited to any particular material, size or shape, it is particularly useful to know, or be able to determine, the beam splitter's light energy transmission, reflection, and absorption rates. A beam splitter that may be utilized in the present invention will typically comprise a light energy transmission, reflection, and even absorption rate. That is, the beam splitter utilized in the power sensor of the present invention will typically transmit some percentage of the received light (e.g., communication beam 45), reflect another percentage of the received light (e.g., reflected beam 50), and may even absorb some of the light energy.

It is to be understood that the present invention does not depend upon a beam splitter producing a specific amount of transmitted or reflected light energy. As such, a beam splitter that transmits 80, 90, 95, or even 99 percent of the light that is received may be used in the present invention. Thus, it is to be realized that no particular transmission, reflection, or absorption energy rate is required, and that most any beam splitter may be used so as long as at least a portion of the received light energy (i.e., incident light energy) is used to produce the reflected beam 50 (i.e., a light beam having reflected light energy).

Because one aspect of the present invention may be utilized as part of a optical network switch utilizing a light beam (e.g., communication beam 45) comprising data, it is particularly useful to maximize the percentage of transmitted light energy and/or reduce the amount of reflected light energy. Accordingly, an appropriate beam splitter may result in a light beam having a transmission light energy level of 95 to 99 percent, or even more, while at the same time generating a reflected light beam with a reflected light energy of 5 to 1 percent, or even less. Communication beam 45 is shown propagating through beam splitter 35 at a particular angle and position. Similarly, reflected beam 50 is shown at a particular orientation (approximately 45 degrees) with respect to beam splitter 35 and reflected beam detector 40; however the present invention is not so limited and most any orientation and positioning may be used.

Referring still to FIG. 4, reflected beam detector 40 is shown in communication with analyzer 42, via communication link 43. Analyzer 42 may comprise, for example, an appropriate computer, display, as well as a variety of other types of input and/or output devices. Appropriate computers that are compatible with the present invention include hand-held computing devices, personal computers, server based workstations, portable computers, and DSP based devices. Communication link 43 may be a wired (or wireless) link that comprises anything from a dedicated connection, to a local area network (LAN) to a wide area network (WAN), a metropolitan area network (MAN), or even the Internet.

Analyzer 42 may be configured to perform a variety of functions. For example, analyzer 42 may be used to monitor the reflected beam detector 40 so that the existence, or non-existence, of a reflected beam 50 can be determined. Additionally, if a suitably designed detector is used, the particular location that the reflected beam 50 strikes the reflected beam detector 40 may be used to determine, for example, the source or destination of communication beam 45 (e.g., which input/output fiber generated or received the communication beam 45).

Another aspect of the present invention may be used to detect and measure light energy levels of the communication beam 45 and/or reflection beam 50. For example, the reflected beam detector 40 may be configured with an appropriate sensor(s) (e.g., an infrared sensor) so that the amount of light energy of reflected beam 50 (i.e., reflected light energy) may be measured. Once the reflectance rate of beam splitter 35 is established (e.g. one percent of the incident light energy), then a simple calculation may be made to determine the light energy level of the communication beam 45 (i.e., incident light energy).

Consider, for example, a beam splitter having a 99 percent light energy transmission rate and a 1 percent light energy reflection rate. To calculate the amount of the light energy of the communication beam 45 (prior to propagation through beam splitter 35), the amount of the reflected light energy that is detected by the reflected beam detector 40 is multiplied by 100. Another example may be where a beam splitter has a 95 percent light energy transmission rate and a 5 percent reflection rate. In this situation, the amount of reflected light energy that is detected may be multiplied by 20 to determine the amount of light energy of the communication beam (prior to propagating through the beam splitter 35).

Analyzer 42 also may be configured to make additional measurements, such as calculating the light energy of the communication beam 45 after it propagates through beam splitter 35. In this type of situation, it may be helpful to obtain the light energy transmission rate of the beam splitter 35. As noted in the above examples, beam splitter 35 may have light energy transmission rate of 99 percent, and a light energy reflection rate of 1 percent. Thus, in this example, the amount of reflected light energy received by reflected beam detector 40 may be multiplied by 99 to determine the amount of light energy of the communication beam 45 (after propagation through the beam splitter 35).

Accordingly, it is to be understood that by monitoring the reflected beam detector 40, the light energy levels of the communication beam 45, before and after propagation through the beam splitter 35, may be obtained.

Figure 5A:
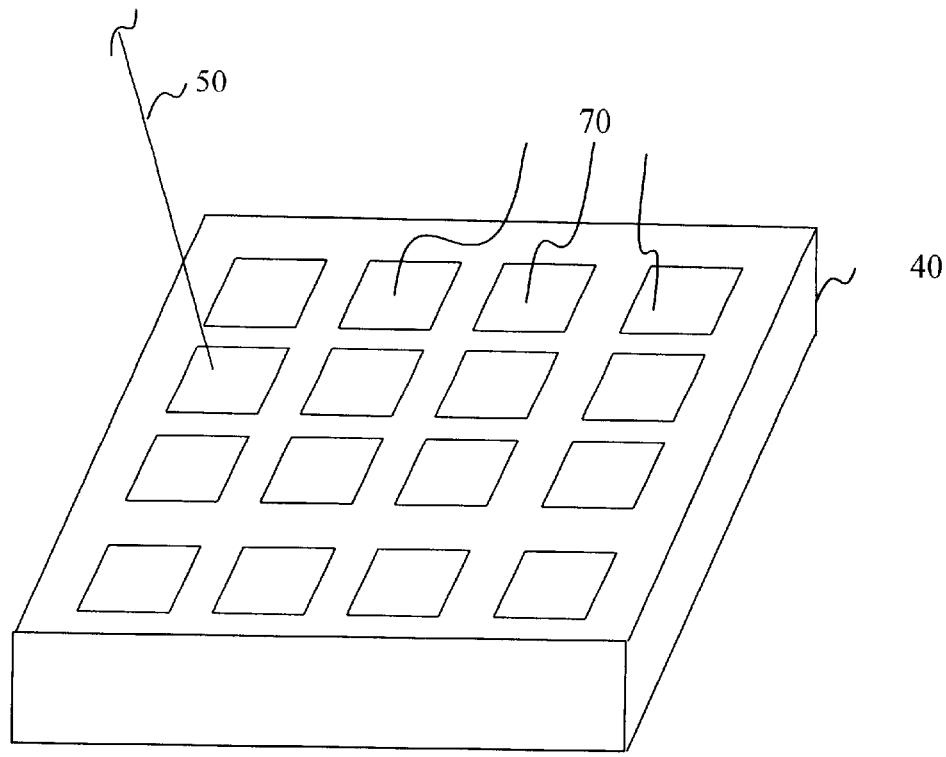
FIGS. 5A–5C are perspective views of exemplary configurations of a reflected beam detector utilized in the communication beam power level sensor of the present invention.
Figure 5B:
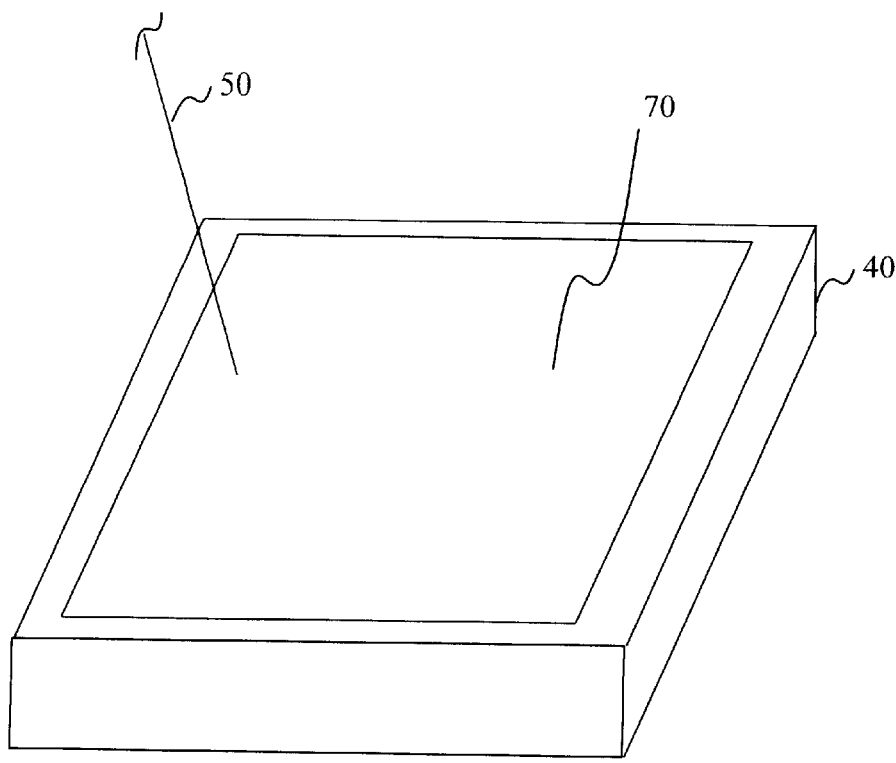

Referring now to FIGS. 5A and 5B, reflected beam detector 40 is shown in two of the many possible configurations that may be used. In particular, FIG. 5A shows a 4×4 array of optical sensors 70 disposed on the surface of the reflected beam detector 40. In a different configuration, as shown in FIG. 5B, reflected beam detector 40 comprises only a single optical sensor 70.

One function of optical sensor 70 is to provide the analyzer 42, for example, with data relating to reflected light beam 40. In particular, optical sensor 70 may provide information, such as the strength or light energy level of the reflected beam 50.

In addition to the just described light energy calculations that may be made, the optical sensor 70 also may provide data that can be used to calculate the origin and/or destination of a communication beam 45. For example, with an appropriate sensor geometry, the location where reflected beam 40 strikes optical sensor 70 may be monitored so that calculations may be performed to identify the origin and/or termination location of the communication beam 45. An example a sensor that may provide this type of information is shown in FIG. 5C.

Figure 5C:
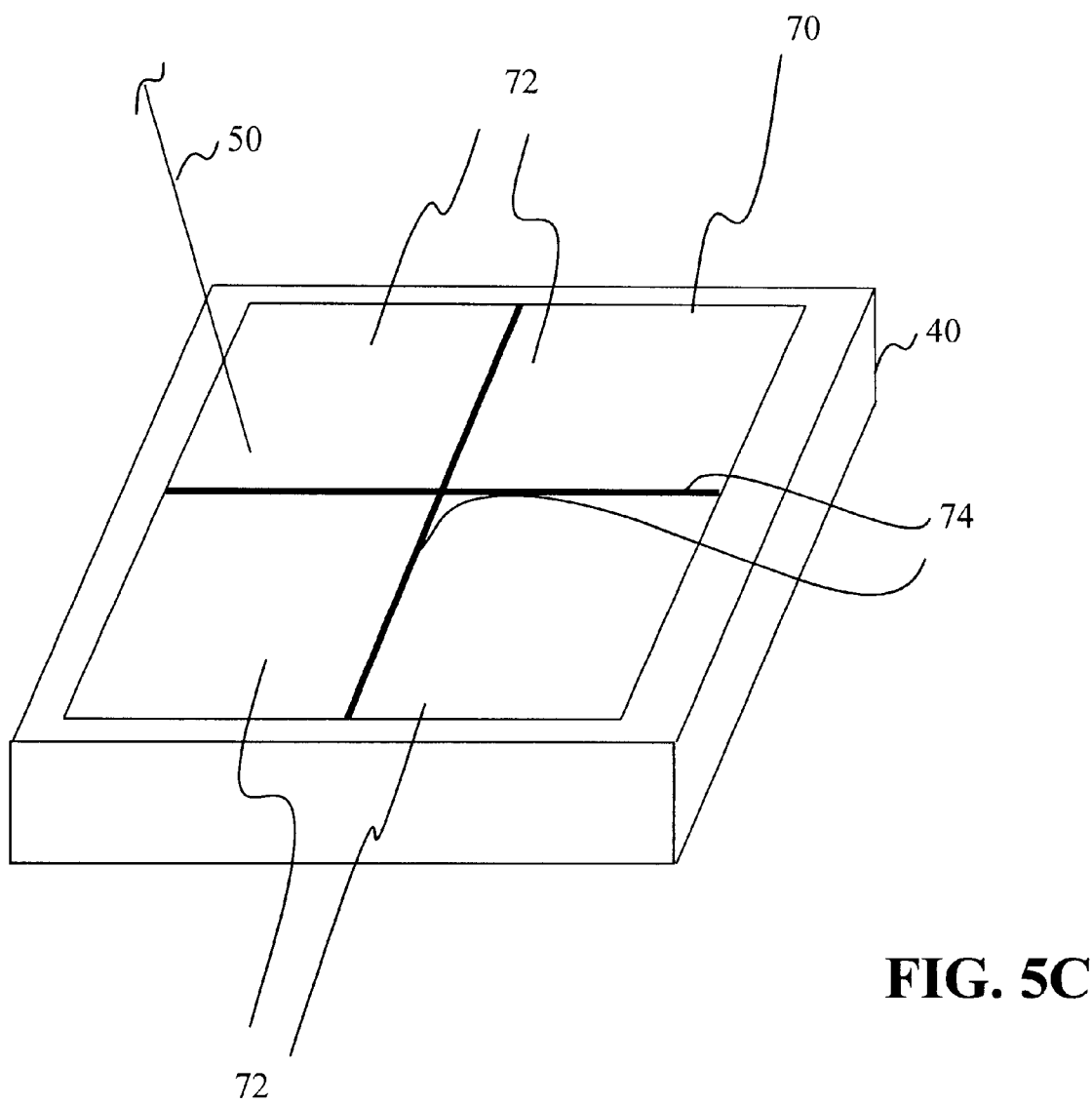

FIG. 5C shows optical sensor 70 divided into four distinct regions, as denoted by sensors 72, that are separated by an insulator 74. Using the sensor configuration shown in FIG. 5C, for example, a communication beam power level sensor may be configured so that a particular beam generator 60, or light beam receiver 61.

Optical sensor 70, and in particular sensors 72, may be constructed of any of the known materials that permit the detection of optical energy. An infrared sensor is one example of an appropriate sensor that may be used. However, these sensors may be fabricated using most any of the known technologies, such as position sensitive diodes (PSD), charge coupled device (CCD) panels, light sensitive CMOS arrays. Additional materials include Indium Gallium Arsenide photodiodes and quadcells, as well as Indium Gallium Arsenide on silicon.

MULTI-BEAM OPTICAL SWITCH CONFIGURATION

Figure 6:
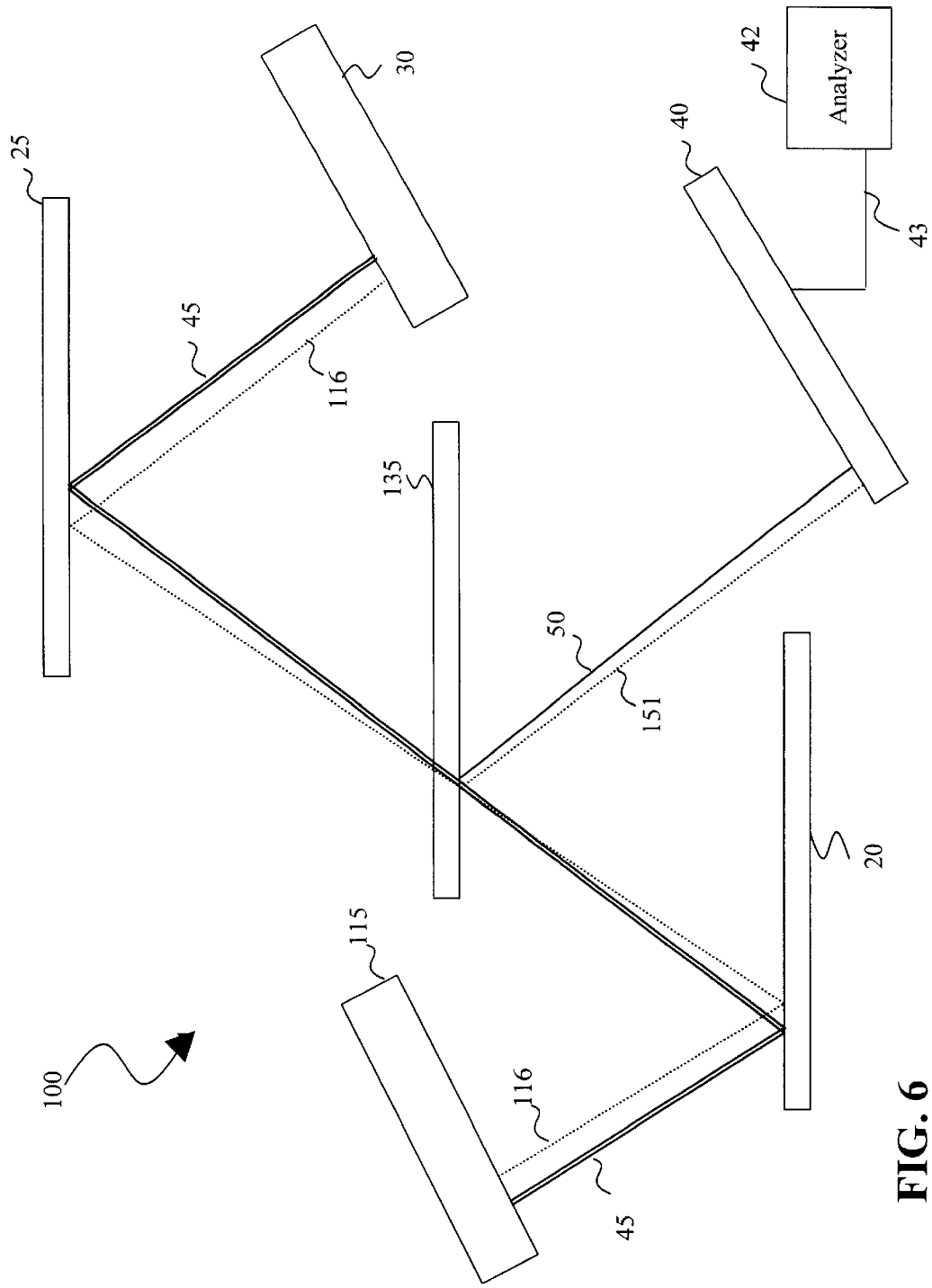
FIG. 6 is a diagram illustrating an exemplary configuration of an alternative embodiment of the communication beam power level sensor of the present invention that compensates for a generated alignment beam.

Referring now to FIG. 6, an exemplary configuration of another embodiment of the present invention is shown and generally designated 100. In this embodiment, sensor 100 comprises a power level sensor for a communication beam that compensates for an alignment beam. In this Figure, sensor 100 may be configured similarly to the sensor illustrated in FIG. 1. However, in contrast to the sensor in FIG. 1, sensor 100 may be configured so that it accommodates for the transmission of multiple optical beams. In particular, sensor 100 may be configured so that a communication beam 45 can be monitored in the presence of an alignment beam 116.

In this configuration, beam generator 15 generates a communication beam 45 and an alignment beam 116 which propagate over a distance until they impinge upon a first beam directing element 20. The first beam directing element 20 then directs the communication beam 45 and alignment beam 116 to a second beam directing element 25. Beams 45 and 116 then may be directed by the second beam directing element 25 to the appropriate portion of the beam receiving element 30.

Similarly to the beam splitter shown in FIG. 1, the beam splitter 135 shown in FIG. 6 is disposed between beam directing elements 20 and 25, causing a portion of the communication beam 45 to be reflected to reflected beam detector 40. Thus, the beam splitter 135 may permit the majority of the light energy of the communication beam 45 to reach the beam receiving element 30, while the reflected beam detector 40 receives the remaining light energy.

As with the beam splitter shown in FIG. 1, beam splitter 135 may be constructed in most any size or shape using most any of the known beam splitter construction materials. However, in contrast to beam splitter 35, beam splitter 135 may be constructed so that it reflects a portion of the light energy of communication beam 45 (e.g., reflected beam 50), in the presence of alignment beam 116.

Another method is to modify the positioning of beam splitter 135 so that only the reflected beam 50, not the reflected alignment beam 151, strikes the optical sensor 70. For example, in situations where the beam splitter 135 produces two reflected beams; one light beam associated with the communication beam 45 (i.e., reflected light beam 50) and a second light beam associated with the alignment beam 116 (e.g. reflected alignment beam 151), only the beam associated with the communication beam would strike the optical sensor 70. Put another way, beam splitter 135 may be positioned so that only the reflected beam 50, not the reflected alignment beam 151, strikes the optical sensor 70.

Figure 7:
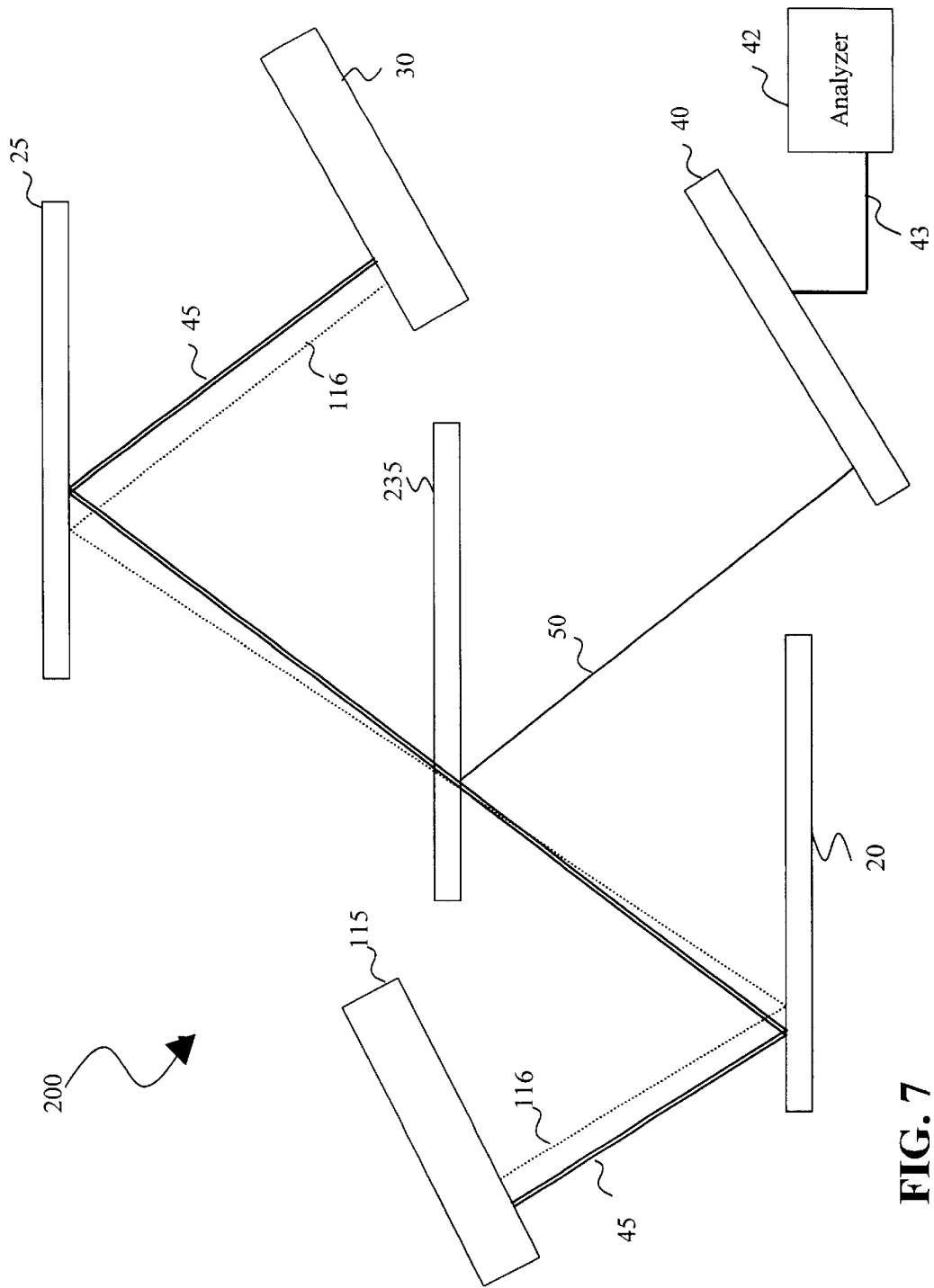
FIG. 7 is a diagram illustrating an exemplary configuration of an another alternative embodiment of the communication beam power level sensor of the present invention that compensates for a generated alignment beam.

Another method that may be used is to utilize an appropriately fabricated beam splitter so that a portion of the communication beam 45 is reflected, while the alignment beam 116 is passed through the beam splitter. An example of this alternative configuration of the power level sensor of the present invention is shown in FIG. 7, and is generally designated 200. In this Figure, communication beam 45 and alignment beam 116 propagate from beam generator 115 to the beam receiving element in a manner that is similar to that described in FIG. 6. However, in contrast to the beam splitter shown in FIG. 6, the beam splitter 235 in FIG. 7 is fabricated so that only the communication beam 45 is reflected, and that all of the light energy of alignment beam 116 passes through the beam splitter 235.

To accomplish this, beam splitter 235 may be constructed of the appropriate material (e.g., glass, dielectric film, etc.) and thickness to selectively reflect a particular wavelength of light, while permitting other wavelengths to pass. When the communication beam 50 strikes the beam splitter 235, it results in reflecting beam 50 being reflected to the reflected beam detector 40 where it may be sampled by the appropriate sensor (e.g. sensor 70, sensors 72, etc.) as previously described.

Figure 8:
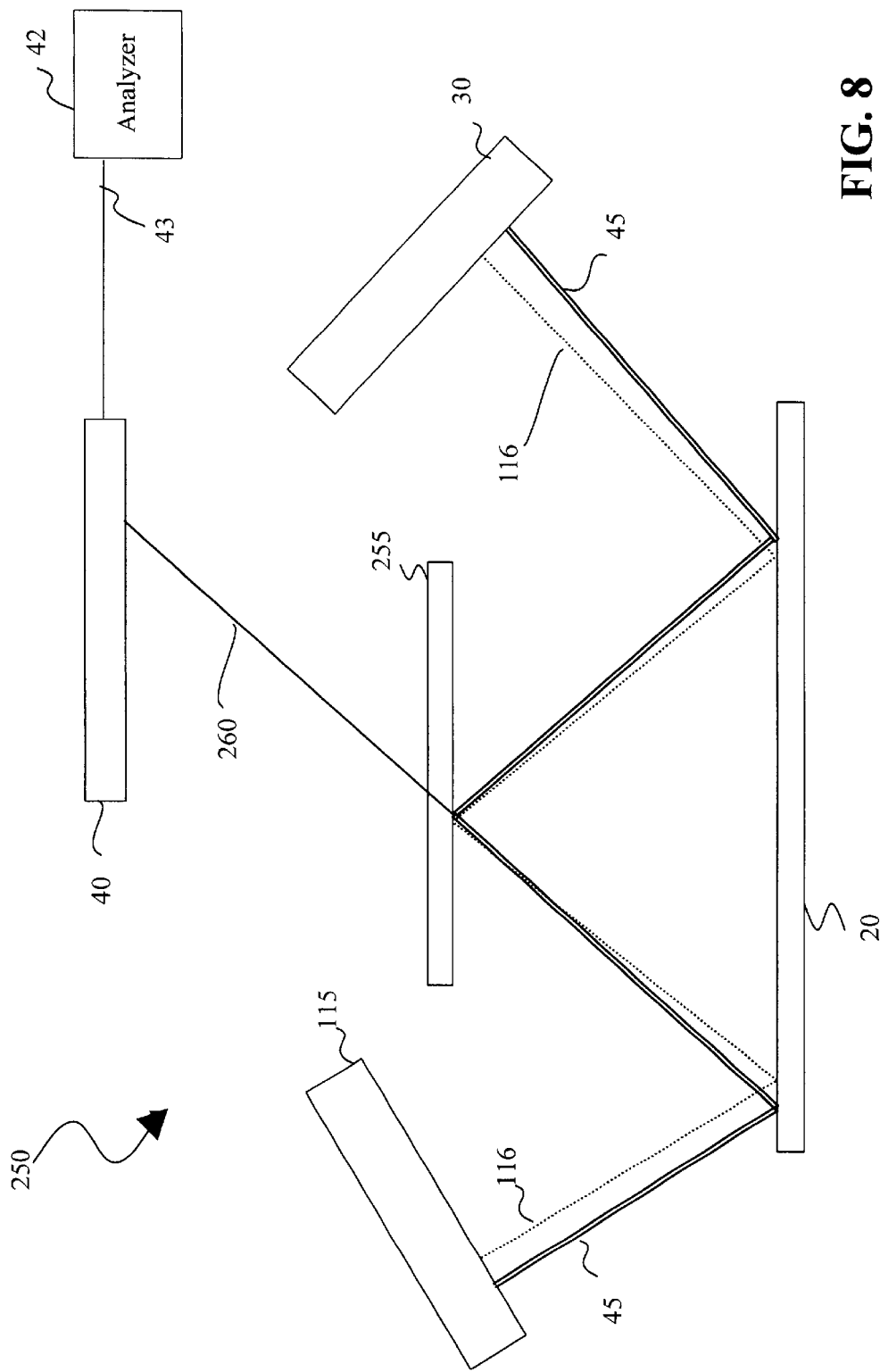
FIG. 8 is a diagram illustrating an exemplary configuration of yet another alternative embodiment of the communication beam power level sensor of the present invention that compensates for a generated alignment beam.

Referring now to FIG. 8, a diagrammatic representation of another alternative embodiment of the present invention is shown and generally designated 250. In this Figure, sensor 250 includes a beam generating element 115, a beam directing element 20, a beam receiving element 30, as well as beam splitter 235.

As shown in FIG. 8, a communication beam 45 and an alignment beam 116 are generated in the beam generating element 115 and then propagate towards beam directing element 20, where they are redirected. Communication beam 45 and alignment beam 116 then continue until they reach beam splitter 255. However, in contrast to the beam splitter in FIG. 7, the alignment beam is reflected from the beam splitter 255 while a portion of the communication beam passes through the beam splitter 255. Transmitted beam 260, which represents a portion of the light energy of communication beam 45, then may continue on a path until it strikes the beam detector 40.

One of the primary differences between beam splitter 255 and beam splitter 235 relates to the transmitted and reflected wavelength. Specifically, beam splitter 235, as shown in FIG. 7, reflects a portion of a communication beam and transmits all of the alignment beam. In contrast, beam splitter 255, as shown in FIG. 8, reflects all of the alignment beam, and transmits a portion of the communication beam.

Regardless of the configuration utilized, once the reflected beam detector 40 detects the light energy of reflected beam 50 or transmitted beam 260, analyzer 42 may perform the necessary processing (as described in FIG.4), to determine the light energy levels of the communication beam 45.

While there have been shown what are presently considered to be preferred embodiments of the present invention, it will be apparent to those skilled in the art that various changes and modifications can be made herein without departing from the scope and spirit of the invention.

What is claimed is:

1. A fiber optic switch device with beam power detection comprising:
   A) a fiber optic input array comprising a plurality of input optical fibers arranged in a pattern, said plurality of optical fibers defining a first number of input optical fibers, each of said input optical fibers defining an input optical axis,
   B) a fiber optic output array comprising a number of output optical fibers arranged in a pattern, each of said number of optical fibers defining an output optical axis, and
   C) a fiber optic, mirror based, power detecting switch comprising:
      1) a second beam directing mirror array comprising a second number of beam directing elements, said second number being equal to said number of output optical fibers, each of said second number of beam directing elements in said second beam directing array being positionable to direct light in a direction along or approximately along the output optical axis of an output optical fiber in said fiber optic output array,
      2) a first beam directing mirror array comprising a first number of beam directing elements, said first number being equal to said number of input optical fibers, each of said beam directing elements in said first beam directing array being positionable to reflect light, being input along or approximately along the input optical axis of an input optical fiber in said first fiber optic array, to any one of the number of beam directing elements in said second beam directing mirror array,
      3) a sensor array comprising an array of optical power sensors each optical power sensor being located at a position corresponding to a beam directing element in said second beam directing array, so as to define a corresponding relationship between each beam directing elements in the second beam directing array and a corresponding optical power sensor in the sensor array,
      4) a beam splitter optically positioned in between said first beam directing array and said second beam directing array so as to reflect to a corresponding optical power sensor a portion of each light beam directed by each beam directing element in said first beam directing array to a corresponding beam directing element in said second beam directing array,
      5) a beam directing minor control for controlling positions of said beam directing elements in said first and second beam directing arrays to permit the direction of light from each one of said plurality of input optical fibers to each one of said plurality of output optical fibers, with a small portion of the light from each one of said plurality of input optical fibers being directed to a particular optical power sensor in said sensor array.

2. A fiber optic switch device as in claim 1 wherein said first and second beam directing arrays are a first MEMS mirror array and second MEMS mirror array, respectively, and each of said beam directing elements is a EMS mirror.

3. The switch as in claim 1 wherein said fiber optic input array also comprises an alignment beam means for producing a plurality of alignment beams, each alignment beam having a beam direction aligned along or approximately along the optical axis of each input optical fiber.

4. The switch as in claim 1 wherein the number of input optical fibers, the number of output optical fibers, the first number of beam directing elements and the second number of beam directing elements are all the same number.

5. A fiber optic switch device with beam power detection comprising:
   A) a fiber optic input array comprising a plurality of input optical fibers arranged in a pattern, said plurality of optical fibers defining a first number of input optical fibers, each of said input optical fibers defining an input optical axis, B) a fiber optic output array comprising a plurality of output optical fibers arranged in a pattern, each of said number of optical fibers defining an output optical axis, and C) a fiber optic, mirror based, power detecting switch comprising:
1) a second MEMS mirror array comprising a second number of MEMS controlled mirrors, said number being equal to said second number of optical fibers, each of said second number of MEMS controlled mirrors in said second MEMS mirror array being positionable to direct light in a direction along or approximately along the output optical axis of an output optical fiber in said fiber optic array,
2) a first MEMS mirror array comprising a first number of MEMS controlled mirrors, said first number being equal to said number of input optical fibers, each of said first number of MEMS controlled mirrors in said first MEMS mirror array being positionable to reflect light, being input from along or approximately along the input optical axis of an input optical fiber in said first fiber optic array, to any one of the MEMS controlled mirrors in said second MEMS mirror array,
3) a sensor array comprising an array of optical power sensors each optical power sensor being located at a position corresponding to a MEMS mirror in said second MEMS array, so as to define a corresponding relationship between each MEMS mirror in the second MEMS mirror array and a corresponding optical power sensor in the sensor array,
4) a beam splitter optically positioned in between said first MEMS mirror array and said second MEMS mirror array so as to reflect to a corresponding optical power sensor a portion of each light beam directed by each mirror in said first MEMS array to a corresponding mirror in said second MEMS array,
5) a MEMS mirror control for controlling positions of said MEMS mirrors in said first and second MEMS mirror arrays to permit the direction of light from each one of said plurality of input optical fibers to each one of said plurality of output optical fibers, with a small portion of the light from each one of said plurality of input optical fibers being directed to a particular optical power sensor in said sensor array.

6. The switch as in claim 5 wherein the number of input optical fibers, the number of output optical fibers, the first number of MEMS controlled mirrors and the second number of MEMS controlled mirrors are all the same number.

* * * * *